Oct. 24, 1961   A. B. SKROMME ET AL   3,005,538
CONVEYOR

Original Filed Jan. 10, 1958                                           2 Sheets-Sheet 2

INVENTORS
A.B. SKROMME &
O.P. LANCE
BY
C.T. Parker and W.A. Murray
ATTORNEYS

United States Patent Office 3,005,538
Patented Oct. 24, 1961

3,005,538
CONVEYOR
Arnold B. Skromme and Orville P. Lance, Moline, Ill., assignors, by mesne assignments, to Deere & Company, a corporation of Delaware
Continuation of application Ser. No. 708,238, Jan. 10, 1958. This application Dec. 11, 1958, Ser. No. 779,796
8 Claims. (Cl. 198—126)

This invention relates to a conveyor and particularly to a bale-type of conveyor which is normally mounted in a hay loft or similar building and which moves bales lengthwise of the conveyor to a position within the building where they will be dumped or discharged from the conveyor. Still more particularly this invention pertains to the means for mounting the conveyor in the building and for connecting various sections of the conveyor to one another.

This is a continuation of copending application, Ser. No. 708,238, filed January 10, 1958 and now abandoned.

The conveyor herein to be described is the type of conveyor constructed of a plurality of sections which are connected in end to end relation to serve as a base or support for a flight type conveyor which moves over the sections and moves bales of hay lengthwise of the sections. One of the primary uses of such a conveyor is in the hay loft of barns of other types of buildings in which the bales of hay move along the conveyor to a position in which it is desired to discharge the hay to one side or the other of the conveyor. The conveyor is normally mounted rather high in the building and in most instances is supported by the rafters or other type of frame work adjacent to the roof of the building. Consequently, the conveyor is located in a position in the building in which access is not easily obtained. Therefore, it is of primary impartance that the means of connecting the various sections to one another is relatively simple and yet relatively strong so that the sections will not separate from one another in operation.

It is the primary purpose of this invention to provide a simple means of mounting the above type of conveyor in a building and one in which the individual sections of the conveyor may be removed for maintenance or replacement without affecting or causing the other sections of the conveyor to be dismantled.

It is also an object of the present invention to provide a simplified means for interconnecting the sections of the conveyor which has considerable strength so that the joint at the connection will not fail in operation.

Other objects and advantages of the present invention will become apparent to those skilled in the art as the nature of the invention is better understood from the following disclosure.

Figure 1:
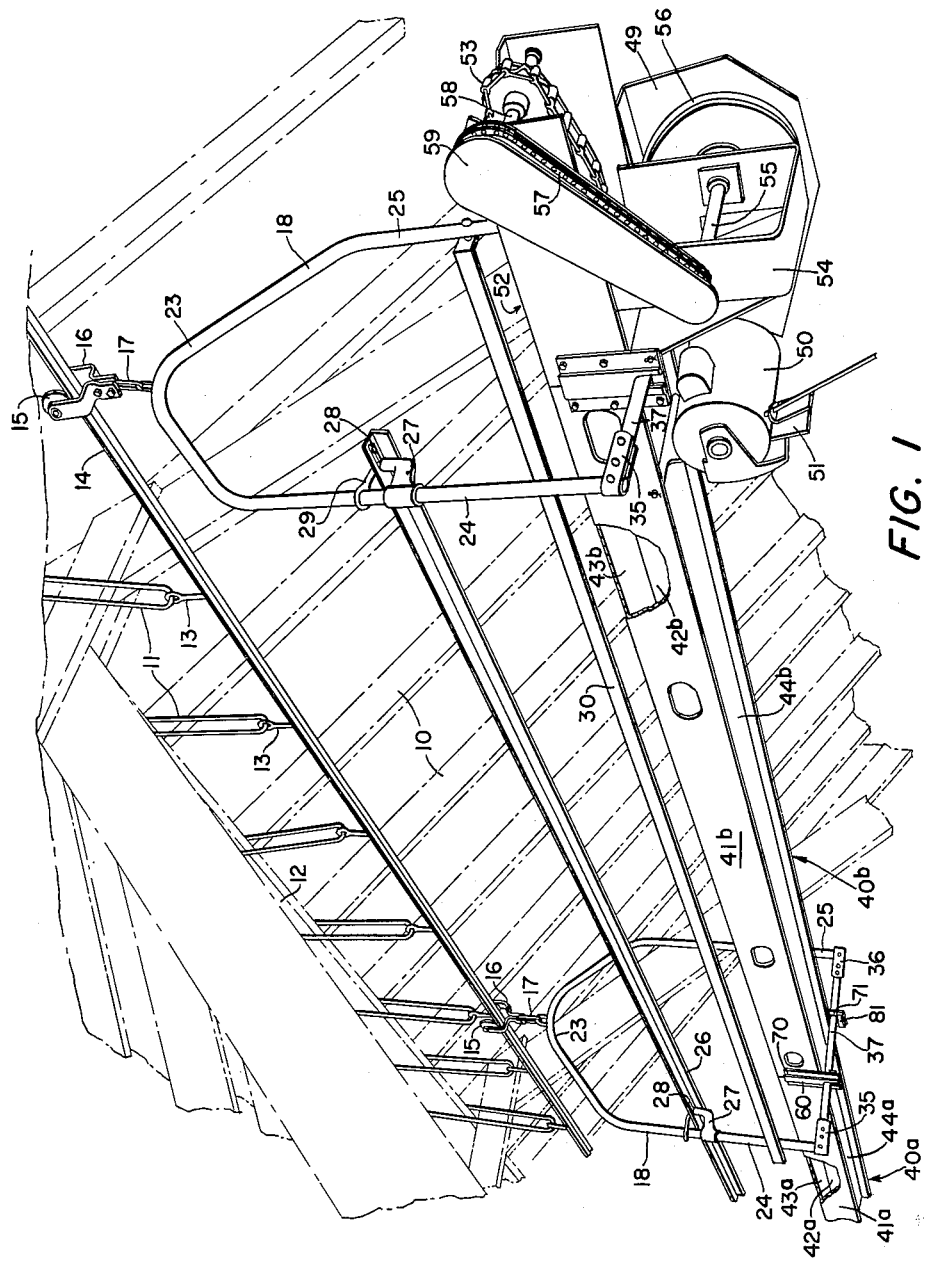
FIG. 1 is a perspective view of a portion of the conveyor and its means of mounting in a building.
Figure 2:
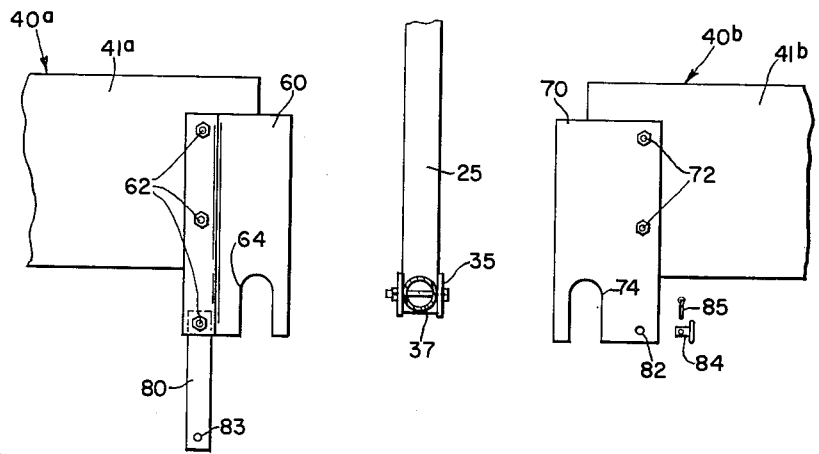
FIG. 2 is an inflated side view of the joint connecting two sections of the conveyor with portions of the sections being shown.

The building shown in dotted representation in FIG. 1 may be a hay loft or a similar type building, such being shown in the present instance only for purposes of orientation. As may be seen, the conveyor is mounted adjacent the roof of the building and proximate to the rafters 10. Provided for primary support for the conveyor are a plurality of vertically disposed U-shaped hanger rods 11 hung from the ridge pole 12. Supported on the lower or bight end of the hanger rods 11 are a series of eye-bolts 13, the lower ends of which are connected to a rail 14. The rail 14, while not shown in detail, is in cross section in the form of an inverted T with the vertical portion of the T connected to the eye-bolts 13. Spaced longitudinally along the rail 14 are a series of rollers 15 which engage the upper surfaces of the horizontal flanges of the T rail. The rollers 15 are in pairs, one for each flange, and are mounted on bifurcated brackets 16. Oval links 17 connect the brackets 16 to the bight portions 23 of U-shaped hanger members 18. The hanger members 18 are further characterized by transversely oppositely disposed depending leg portions 24, 25. Side rails 26 are supported on the leg portions 24, 25 by means of inwardly extending socket brackets 27 and socket rods 29 which are turned downwardly to fit through a slot 28. The purpose of the slots 28 is to permit limited movement fore-and-aft of the support members 18. Also provided is a discharge rail 30 which crosses diagonally from the leg 25 to the leg 24 of the next adjacent hanger member 18 and serves to guide bales off one side of the conveyor. This type of discharge from the conveyor is more or less conventional and no point of invention is meant to be claimed relative to this feature, such being shown only for purposes of a full understanding of the manner in which this type of conveyor operates.

At the lower ends of the legs 24, 25 are U-shaped brackets 35, 36 respectively which are bolted to the lower end of the respective leg portions and are turned inwardly therefrom to receive opposite ends of a cross rod or pipe 37 which fits beneath the conveyor.

The conveyor itself is composed of a plurality of supporting or conveyor sections which are substantially similar and are mounted in end to end relation to form a rigid elongated support for the conveyor. Only two sections 40a, 40b are shown in the present invention, although any number of sections could be added. The sections 40a, 40b are composed generally of panels forming box-shaped cross sections and include depending side panels 41a, 41b respectively, and 42a, 42b respectively, interconnected at their upper edges by laterally disposed cross panels 43a, 43b respectively, and at their lower edges by cross panels 44a, 44b respectively.

A drive mechanism is provided at the front end of the section 40b and includes an electric motor 50 which is carried on a T-shaped bracket 51, the upper portion of the T-shaped plate or bracket 51 being pivotally mounted for vertically swinging in the side panels 41b, 42b of the section 40b. The upper portion of the drive mechanism includes a short support section 52 similar in cross section and continuous with the sections 40a, 40b. The section 52 also serves as support for the front end of the conveying means, here in the form of a conveyor chain 53, and for its drive mechanism. The section 52 is left open at its bottom.

A U-shaped supporting bracket 64 depends from opposite side panel portions of the supporting section 52 and supports a drive shaft 55, one end of which is driven from the motor 50 by means of a V-belt drive, indicated in its entirety by the pulley and belt 56. The opposite end of the drive shaft 55 drives a sprocket, not shown, which operates a chain drive, indicated in its entirety by a reference numeral 57, which in turn drives the conveyor drive shaft 58. As may be seen, the weight of the motor 50 operates to maintain tension on the belt drive 56. Suitable shielding as at 49 and 59 is mounted over the belt drive 56 and chain and sprocket drive 57.

The panel members of the conveyor sections 40a and 40b are butted against one another and are mounted on the section supports 18 and specifically on the cross pipe or rod 37 by means of upright plates 60 and 61 bolted at 62, 63 to be rigid with the end of the section 40a and specifically to the side panels 41a, 42a respectively. The plates 60, 61 depend from the lower edge of the side panels 41a, 42a and have slots, as at 64, opening from the lower edge of the plate for receiving the cross bar or pipe 37.

Figure 3:
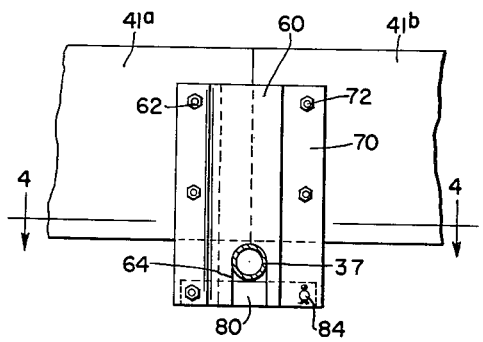
FIG. 3 is a side view showing the end portions of the conveyor sections in their connected positions.
Figure 4:
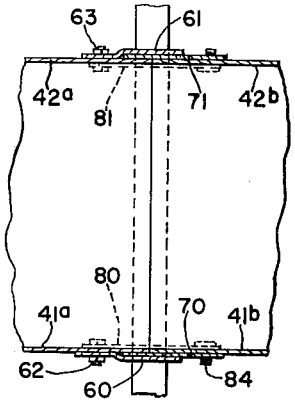
FIG. 4 is a sectional view taken substantially along the line 4—4 of FIG. 3.

On the adjacent end of the conveyor section 40b are a pair of plates 70, 71 bolted, as at 72, 73 to be rigid with the depending side panels 41b, 42b of the conveyor section 40b. The plates 70, 71 are also provided with slots 74 opening from their lower edge for receiving the cross brace or pipe 37. It should be recognized that the plates 60, 61, 70, 71 while shown as separate from the sections 40a, 41a could be a continuation of the side panels forming part of those sections, in either case the plates would be rigid with the sections. Upright plates 60, 61 and 70, 71 extend beyond the ends of the conveyor sections 40a, 40b so as to be in longitudinal overlapping relation with the upright plates of the adjacent section. The sections 40a, 40b, when assembled (FIGS. 3, 4), will have the slots 64, 74 in transverse registration to receive a common cross rod 37. The plates 60, 61 are turned or formed outwardly from the plane of the side panels 41a, 42a so as to permit the plates 70, 71 to be inserted between the plates 60, 61 and the side panels 41a, 42a and 41b, 42b (such being shown clearly in FIG. 4). The sections 40a, 40b are mounted on the cross rod 37 by positioning the section 40a so that the cross rod 37 is received in the slots of the plates 60, 61 and inserting the adjacent plates 70, 71 and their associated section 40a in a position shown in FIGS. 3 and 4 wherein the cross piece 37 will reside in the slots of all the plate portions 60, 61, 70, 71. Provision is made for locking the sections in this position by means of links or bars 80, 81 which are carried by the lower of the bolts 62, 63 and are adapted to swing upwardly to positions adjacent to an aperture 82 in the plate 70 and a similar one, not shown, in the plate 71. An aperture 83 is provided in the lower end of the bar 80 which is registrable with the aperture 83 so as to receive a round-headed pin 84 held in position by means of a cotter pin 85. A similar connecting means, not shown, is provided for locking the bar 81 in its locked position. The purpose of the bars 80, 81 is to provide means for closing the slots 64, 74 from the lower edges thereby locking the cross piece or bar 37 in position. The slots 64, 74 are also round at their upper edges to effect a pivotal connection about the cross piece 37.

Normal mounting of the above described conveyor on the track or rail 14 will occur at one end of the building. In most instances a bale elevator will be used outside the building and the conveyor sections may be moved on the elevator to the end of the building and may be attached to the rail 14 while still supported on the elevator. Initially section 52 will be mounted on the first cross rod 37 with the adjacent end of the section 40b. The supporting member 18 is then rolled down the track 14 until the opposite end of the section 40b may be slipped over the next cross bar 37 of the next supporting hanger member 18. At the same time the adjacent end of the next conveyor section 40a will be mounted on the rod 37 and both will be locked in position on the cross piece 37. Since the support 18 may move fore-and-aft about its upper end and since there is a pivotal connection over the cross bar 37, the entire assembly is more or less articulate so that prior to assembly adjustments may be made so as to easily fit the sections together merely by pivoting the support at its upper or lower end. The rails 26 may be added merely by raising the lock pins or rods 29 out of the socket members 27 and placing them through the slots 28. In this manner, conveyor sections may be added or subtracted depending upon the exact location that it is desired to discharge the bales. Also, should it be desired to remove a section, for repair or transfer to other places, such may be removed temporarily without disassembling the entire conveyor system since there is only the requirement that the bars 80, 81 be dropped so as to permit the sections to be raised from the cross bar 37. It is of course obvious that this type of conveyor contemplates using a type of link chain in which sections of the chains may be removed or sections added without difficulty.

While only one form of the invention has been shown, it should be recognized that other forms and variations could exist without departing basically from the broad general principles herein disclosed. It should therefore be understood that while the preferred embodiment of the invention has been described with the view of clearly and concisely illustrating the invention, it is desired not to so limit or narrow the invention beyond that which is herein claimed.

What is claimed is:

1. An elongated conveyor of the type described comprising: an elongated rail adapted for support above and longitudinal of the conveyor; a plurality of U-shaped hanger members spaced longitudinally relative to the rail, each of the U-shaped hanger members having a transverse bight portion and depending leg portions; means mounting the U-shaped members on the rail permitting longitudinal movement of the members on the rail; a plurality of elongated conveyor sections, each of the sections being generally similar in cross section with the other sections and disposed in end to end relation with the other sections to form a continuous uniform conveyor support, and each of the sections having depending longitudinally extending side panels interconnected at their upper edges by a longitudinal laterally disposed panel; cross rods disposed under the sections proximate the ends thereof; means connecting opposite ends of the cross rods to opposite depending leg portions respectively of the U-shaped hanger members; upright plate portions rigid with the side panels adjacent opposite ends of the sections and extending in longitudinal overlapping relation with the plate portions on the end of the next adjacent section, and each of the plate portions having therein a slot opening downwardly for receiving a cross rod, the slots of each of the plate portions being transversely registrable with the slots of the plate portion on the next adjacent section; locking elements mounted on the plate portions adaptable for closing the lower end of the slots and operative to prevent the cross rod from leaving the slots; and conveyor means supported by the conveyor support for moving material lengthwise of the support.

2. An elongated conveyor of the type described comprising: a plurality of spaced apart U-shaped hanger members, each having a bight portion and depending leg portions; a plurality of elongated conveyor sections positioned between the depending leg portion, each of the sections being generally similar in cross section with the other sections and disposed in end to end relation with the other sections to form a continuous uniform conveyor support, and each of the sections having depending longitudinally extending side panels interconnected at their upper edges by a longitudinal laterally disposed panel; cross rods disposed under the sections proximate the ends thereof; means connecting opposite ends of the cross rods to opposite depending leg portions respectively of the U-shaped hanger members; upright plate portions rigid with the side panels adjacent opposite ends of the sections and extending in longitudinal overlapping relation with the plate portions on the end of the next adjacent section, and each of the plate portions having therein a slot opening downwardly for receiving a cross rod, the slots of each of the plate portions being transversely registrable with the slots of the plate portion on the next adjacent section; locking elements mounted on the plate portions adaptable for closing the lower end of the slots and operative to prevent the cross rod from leaving the slots; and conveyor means supported by the conveyor support for moving material lengthwise of the support.

3. An elongated conveyor of the type described comprising: a plurality of spaced apart U-shaped hanger members, each having a bight portion and depending leg portions; a plurality of elongated conveyor sections positioned between the depending leg portion, each of the sections being generally similar in cross section with the other sections and disposed in end to end relation with the other sections to form a continuous uniform conveyor support, and each of the sections having depending longitudinally extending sides; cross rods disposed under the sections proximate the ends thereof; means connecting opposite ends of the cross rods to opposite depending leg portions respectively of the U-shaped hanger members; upright plate portions rigid with each of the sides adjacent opposite ends of the sections and extending in longitudinal overlapping relation with the plate portions on the end of the next adjacent section, and each of the plate portions having therein a slot opening downwardly for receiving a cross rod, the slots of each of the plate portions being transversely registrable with the slots of the plate portion on the next adjacent section; locking elements mounted on the plate portions adaptable for closing the lower end of the slots and operative to prevent the cross rod from leaving the slots; and conveyor means supported by the conveyor support for moving material lengthwise of the support.

4. An elongated conveyor of the type described comprising: an elongated rail adapted for support above and longitudinal of the conveyor; a plurality of U-shaped hanger members spaced longitudinally relative to the rail, each of the U-shaped hanger members having a transverse bight portion and depending leg portions; means mounting the U-shaped members on the rail permitting longitudinal movement of the members on the rail; a plurality of elongated conveyor sections positioned between the depending leg portions, each of the sections being generally similar in cross section with the other sections and disposed in end to end relation to the other sections to form a continuous uniform conveyor support, and each of the sections having depending longitudinally extending side panels inter-connected at their upper edges by a longitudinal laterally disposed panel; cross rods disposed under the sections proximate the ends thereof; means connecting opposite ends of the cross rods to opposite depending leg portions respectively of the U-shaped hanger members; upright plate portions rigid with the side panels adjacent opposite ends of the sections and extending in longitudinal overlapping relation with the plate portions on the end of the next adjacent section, and each of the plate portions having therein a slot opening downwardly for receiving a cross rod, the slots of each of the plate portions being transversely registrable with the slots of the plate portion on the next adjacent section; locking elements mounted on the plate portions adaptable for closing the lower end of the slots and operative to prevent the cross rod from leaving the slots; side rails on opposite sides of and above the support; means detachably mounting the side rails on the depending portions of the hanger members; and conveyor means supported on the conveyor support for moving material lengthwise of the support.

5. The invention defined in claim 3 in which each of the cross rods has a circular cross section and the slots are such as to permit pivotal movement between the cross rods and the respective sections.

6. An elongated conveyor of the type described comprising: an elongated rail adapted for support above and longitudinal of the conveyor; a plurality of U-shaped hanger members spaced longitudinally relative to the rail, each of the U-shaped hanger members having a transverse bight portion and depending leg portions; means mounting the U-shaped members on the rail permitting longitudinal movement of the members on the rail; a plurality of elongated conveyor sections, each of the sections being generally similar in cross section with the other sections and disposed in end to end relation with the other sections to form a continuous uniform conveyor support; cross rods disposed under the sections for vertical support thereof; means pivotally and detachably connecting opposite ends of the cross rods to opposite depending leg portions respectively of the U-shaped hanger members; and conveyor means supported by the conveyor support for moving material lengthwise of the support.

7. An elongated conveyor of the type described comprising: an elongated rail adapted for support above and longitudinal of the conveyor; a plurality of hanger members spaced longitudinally relative to the rail; means mounting the hanger members on the rail permitting longitudinal movement of the members on the rail; a plurality of elongated conveyor sections, each of the sections being generally similar in cross section with the other sections and disposed in end to end relation with the other sections to form a continuous uniform conveyor support; means pivotally and detachably connecting the lower ends of the hanger members to the conveyor sections; and conveyor means supported by the conveyor support for moving material lengthwise of the support.

8. An elongated conveyor of the type described comprising: an elongated rail adapted for support above and longitudinal of the conveyor; a plurality of hanger structures depending from the rail and mounted for longitudinal movement along the rail, each including a pair of transversely spaced depending leg portions; a plurality of elongated conveyor sections positioned between the leg portions and disposed in end to end relation to form a continuous conveyor support; cross rods disposed under the sections proximate the ends thereof; means connecting opposite ends of the cross rods to opposite depending leg members respectively; portions on the conveyor sections extending longitudinally and each portion having therein a slot for receiving a cross rod, the slots of each of the portions being transversely aligned with the slots of the portion on the next adjacent section; locking elements mounted on the portions effective to prevent the cross rod from leaving the slots; and conveyor means supported by the conveyor support for moving material lengthwise of the support.

References Cited in the file of this patent

UNITED STATES PATENTS

| 1,086,522 | Gilman | Feb. 10, 1914 |
| 1,090,670 | Zimmerman | Mar. 17, 1914 |
| 1,235,679 | Gerberich | Aug. 7, 1917 |
| 1,373,436 | Lombi | Apr. 5, 1921 |
| 2,101,017 | Bebinger | Dec. 7, 1937 |
| 2,577,926 | Stiles | Dec. 11, 1951 |
| 2,745,540 | Smoker | May 15, 1956 |

FOREIGN PATENTS

| 204,689 | Germany | Dec. 2, 1908 |
| 366,678 | Great Britain | Feb. 11, 1932 |
| 497,922 | Belgium | Jan. 2, 1951 |